United States Patent
Shah et al.

(10) Patent No.: US 8,216,351 B2
(45) Date of Patent: Jul. 10, 2012

(54) CARBON DIOXIDE PURIFICATION APPARATUS

(75) Inventors: Minish Mahendra Shah, East Amherst, NY (US); Henry Edward Howard, Grand Island, NY (US)

(73) Assignee: Praxair Technology, Danbury, CT (US)

( * ) Notice: Subject to any disclaimer, the term of this patent is extended or adjusted under 35 U.S.C. 154(b) by 338 days.

(21) Appl. No.: 12/632,297

(22) Filed: Dec. 7, 2009

(65) Prior Publication Data
US 2010/0077795 A1    Apr. 1, 2010

Related U.S. Application Data

(63) Continuation of application No. 11/395,143, filed on Apr. 3, 2006, now Pat. No. 7,666,251.

(51) Int. Cl.
*B01D 53/14* (2006.01)
*B01D 53/02* (2006.01)

(52) U.S. Cl. ............... 96/242; 62/606; 62/617; 203/12; 203/39; 95/94; 95/117; 95/183; 95/228; 95/229; 95/231; 95/236

(58) Field of Classification Search ............ 62/619, 62/636, 606, 617; 203/12, 39; 95/92–94, 95/117, 183, 231, 236
See application file for complete search history.

(56) References Cited

U.S. PATENT DOCUMENTS

| | | | | |
|---|---|---|---|---|
| 3,130,026 A | * | 4/1964 | Becker | 62/634 |
| 4,152,129 A | * | 5/1979 | Trentham et al. | 62/623 |
| 4,417,449 A | * | 11/1983 | Hegarty et al. | 62/622 |
| 4,441,900 A | * | 4/1984 | Swallow | 62/622 |
| 4,595,404 A | * | 6/1986 | Ozero et al. | 62/630 |
| 4,753,666 A | * | 6/1988 | Pastor et al. | 62/628 |
| 4,762,543 A | * | 8/1988 | Pantermuehl et al. | 62/625 |
| 4,952,223 A | * | 8/1990 | Kirshnamurthy et al. | 62/626 |
| 4,969,338 A | * | 11/1990 | Kirshnamurthy et al. | 62/373 |
| 5,017,204 A | * | 5/1991 | Gottier et al. | 62/639 |
| 5,927,103 A | * | 7/1999 | Howard | 62/620 |
| 5,974,829 A | * | 11/1999 | Novak et al. | 62/617 |
| 6,035,662 A | * | 3/2000 | Howard et al. | 62/617 |
| 6,070,431 A | * | 6/2000 | Howard | 62/620 |
| 6,301,927 B1 | * | 10/2001 | Reddy | 62/619 |
| 7,461,522 B2 | * | 12/2008 | Howard | 62/617 |
| 2002/0059807 A1 | | 5/2002 | Wong et al. | |
| 2005/0092594 A1 | | 5/2005 | Parro et al. | |
| 2007/0232706 A1 | | 10/2007 | Shah et al. | |

FOREIGN PATENT DOCUMENTS

| | | |
|---|---|---|
| DE | 3639779 A1 | 6/1988 |
| JP | 56-077673 A | 6/1981 |
| WO | WO 2006/054008 A1 | 5/2006 |

* cited by examiner

*Primary Examiner* — Duane Smith
*Assistant Examiner* — Ives Wu
(74) *Attorney, Agent, or Firm* — David M. Rosenblum

(57) ABSTRACT

An Apparatus for purifying a feed stream containing carbon dioxide in which the feed stream, after having been compressed and dried, is partly cooled and then used to reboil a stripping column. Thereafter, the feed stream is further cooled and expanded to a lower operational temperature of the stripping column. A carbon dioxide product stream composed of the liquid column bottoms of the stripping column is expanded at one or more pressures to generate refrigeration, then fully vaporized within the main heat exchanger and compressed by a compressor to produce a compressed carbon dioxide product. Refrigeration is recovered in the main heat exchanger from a column overhead stream extracted from the stripping column within the main heat exchanger either directly or indirectly by auxiliary processing in which carbon dioxide is further separated and optionally recycled back to the main compressor used in compressing the feed stream.

12 Claims, 3 Drawing Sheets

CARBON DIOXIDE PURIFICATION APPARATUS

RELATED APPLICATIONS

This application is a continuation of U.S. patent application Ser. No. 11/395,143, filed Apr. 3, 2006 now U.S. Pat. No. 7,666,251.

FIELD OF THE INVENTION

The present invention relates to a carbon dioxide purification apparatus for purifying a feed stream containing carbon dioxide within a stripping column to produce a carbon dioxide product. More particularly, the present invention relates to such a purification apparatus in which the feed stream is compressed and introduced into a stripping column at a pressure below the pressure of the feed stream to allow sufficient heat transfer from the feed stream to the reboiler of the stripping column to produce carbon dioxide with high purity and for recovering product carbon dioxide at super atmospheric pressure to minimize compression energy.

BACKGROUND OF THE INVENTION

Carbon dioxide is a valuable industrial product having a variety of uses that require that carbon dioxide to be of high purity, namely, over 95 percent pure carbon dioxide by volume. In some instances, it is necessary to remove undesirable impurities from carbon dioxide. And in some instances, it is desirable not to lose valuable components in the product carbon dioxide. One important use for carbon dioxide is in the field of enhanced oil recovery in which the carbon dioxide is injected down hole in an oil field to drive oil to producing wells. Typically, in an enhanced oil recovery operation, a fresh stream of carbon dioxide is mixed with a recycle stream of carbon dioxide that is generated when oil is produced. This recycled carbon dioxide stream contains about 80 to 95 percent by volume carbon dioxide and the remainder, impurities that consist mainly of hydrocarbons ranging from C1 to C7 alkanes. In this regard, the methane content of the impurities is known to affect the performance of the enhanced oil recovery and hence, methane removal is beneficial for such operations.

As indicated above, carbon dioxide has many uses beyond enhanced oil recovery and can be introduced into a pipeline for use at locations that are situated a distance from the production site at which the carbon dioxide is produced. In such an application, moisture within the carbon dioxide stream can cause corrosion problems for the pipeline. Hence, moisture removal is important. Moreover, it is also beneficial to remove other impurities from a carbon dioxide stream to be injected into a pipeline because many uses of carbon dioxide require nearly pure carbon dioxide. Moreover, compressing a stream into a pipeline that contains impurities, that will invariably need to be removed, increases the electrical power costs associated with compressing the stream due to the added volume of the impurities.

Carbon dioxide can be produced by oxy-fuel combustion in, for example, coal-fired power plants. Typically, the flue gas produced by the combustion has a carbon dioxide purity that ranges from about 70 percent to about 90 percent depending upon the purity of the oxygen supplied and any air leakage into the boiler. Thus, the impurities within a carbon dioxide stream produced by such a process can include oxygen, nitrogen, argon, SOx and NOx. Sulfur oxides and nitrogen oxides are particularly undesirable impurities in any process stream.

In enhanced oil recovery processes, the oxygen content must be less than 100 ppm and preferably less than 10 ppm and the desired purity of the carbon dioxide must be at minimum, about 95 percent pure. Hence, removal of the oxygen impurity is particularly important for enhanced oil recovery operations.

Carbon dioxide can also be produced from a hydrogen plant in which a hydrocarbon containing stream is subjected to steam methane reforming or alternatively to partial oxidation to produce a hydrogen, carbon monoxide, carbon dioxide and water containing stream known as synthesis gas. In any such plant, the synthesis gas can in turn be subjected to a water-gas shift reaction to react steam with the carbon monoxide and thereby increase the hydrogen and carbon dioxide contained in such a stream. In a plant designed to produce hydrogen, the hydrogen is typically separated from the synthesis gas by pressure swing adsorption. The waste stream produced by pressure swing adsorption contains carbon monoxide and methane impurities. These components are typically recovered and can be used to meet part of the fuel requirements of the plant. The carbon dioxide can be recovered from the synthesis gas either before or after the water-gas shift reactor.

In U.S. Pat. No. 6,301,927, an auto-refrigerated process for separating carbon dioxide is provided in which a carbon dioxide containing feed stream is compressed, cooled and expanded in a turboexpander so that it is partially liquefied and then introduced into a phase separator. The liquid component is then introduced into a stripping column to produce a liquid carbon dioxide product. The stripping column is reboiled by a compressed part of the feed stream that is at a much higher temperature than column operational temperatures. Such an operation results in thermal inefficiency that represents an irreversible loss that must be made up by increased refrigeration and ultimately, in increased compression and power requirements.

In U.S. Pat. No. 4,441,900, a process for removing carbon dioxide from natural gas is disclosed in which the feed stream is partially condensed by cooling and then is separated in a phase separator. The liquid stream resulting from the phase separation is subcooled and then fed to a stripping-distillation column to recover carbon dioxide-rich liquid and a first methane-rich vapor. The first methane-rich vapor is combined with the vapor from the phase separation and the combined vapor is further cooled and then rectified in a rectification column to produce a second carbon dioxide liquid and a second methane-rich vapor. Refrigeration is supplied by expanding the second methane-rich vapor and the carbon dioxide-rich liquid streams. All of the columns described in this patent are operated at the feed stream pressure and hence, reboiling within the columns is conducted at a relatively high temperature. As a result, the feed stream can supply only a limited amount of thermal energy to reboilers of the distillation columns and the carbon dioxide product streams will always contain significant amounts of methane.

U.S. Pat. No. 3,130,026 discloses another process for separating carbon dioxide from natural gas in which the feed is cooled and partially liquefied and then fed to a phase separator. The liquid stream from the phase separator is stripped in a stripping column. The carbon dioxide liquid stream from the stripping column is vaporized and then work expanded to recover power and to generate refrigeration which is used to partially liquefy the feed stream. Due to expansion of carbon dioxide in the separation process, carbon dioxide from the separation process is obtained at near atmospheric pressure. The expansion of carbon dioxide at subatmospheric temperature generates much lower power than that required for compressing carbon dioxide above atmospheric pressure. As a result, when compressed carbon dioxide is a desired product, this process will require significant energy for compression. Additionally, the use of multiple turboexpanders also increases the capital cost of the separation system.

U.S. Pat. No. 4,762,543 discloses a carbon dioxide separation process in which compressed gas is chilled in an ammonia separator so that it is partially condensed. The partially condensed stream is fed to a separator. The vapor component of the stream separated within the separator is introduced into a rectification column that utilizes a reflux condenser that again employs external ammonia refrigeration. U.S. Pat. No. 4,595,404 is another externally refrigerated process in which methane is separated from carbon dioxide by using a distillation column followed by a stripping column. The disadvantage of utilizing external refrigeration is that additional energy is consumed by such refrigeration and additional capital investment for the refrigeration system can represent an unacceptable economic penalty.

As will be discussed, the present invention provides an apparatus for separating carbon dioxide from a carbon dioxide feed stream that is inherently more thermally efficient than the prior art techniques and thus, consumes less compression energy, achieves high carbon dioxide recovery and further allows the carbon dioxide to be recovered at a high purity. Other advantages will become apparent from the following description of the present invention.

SUMMARY OF THE INVENTION

The present invention provides an apparatus for purifying a feed stream containing carbon dioxide to obtain a carbon dioxide product. The present invention is useful for purifying feed streams containing between about 30 and about 95 percent carbon dioxide.

In accordance with the invention, a means is provided for drying a feed stream having a super atmospheric pressure. A main heat exchanger is connected to the drying means and configured to partially cool the feed stream after having been dried. A stripping column is provided having contacting elements to contact a descending liquid phase with an ascending vapor phase within the stripping column to strip impurities from the descending liquid phase and thereby to produce a carbon dioxide-lean column overhead and a carbon dioxide-rich, liquid column bottoms. A reboiler is operatively associated with the stripping column to initiate the formation of the ascending vapor phase within the stripping column. The reboiler is connected to the main heat exchanger so that the stripping column is reboiled with the feed stream after having been partially cooled and the feed stream is further cooled within the reboiler;

The main heat exchanger is also connected to the reboiler and is configured to further cool the feed stream in the main heat exchanger and to at least partially liquefy the feed stream after the feed stream is further cooled within the reboiler. The stripping column is in flow communication with the main heat exchanger such that the stripping column receives at least part of the feed stream after having been partially liquefied in the main heat exchanger and the descending liquid phase is thereby established within the stripping column. A feed stream expansion valve is positioned between the main heat exchanger and the stripping column so that, prior to reception of the at least part of the feed stream into the stripping column, the feed stream is expanded to an operational pressure of the stripping column that is less than that of the feed stream. The foregoing lowers a reboiling temperature at which the stripping column reboils to a level that is below the feed stream temperature after having been partially cooled.

A means is provided for recovering refrigeration in the main heat exchanger from a carbon dioxide-lean stream composed at least in part of a column overhead stream column made up of the carbon dioxide-lean column overhead of the stripping column. At least one product stream expansion valve is connected to the stripping column for expanding a carbon dioxide product stream composed of the carbon dioxide-rich, liquid column bottoms of the stripping column. The main heat exchanger is connected to the at least one product stream expansion valve and is also configured to vaporize the carbon dioxide product stream. A compressor is connected to the main heat exchanger for compressing the carbon dioxide product stream to obtain a compressed carbon dioxide stream as at least part of the carbon dioxide product desired from the process.

Since the stripping column is operated at a low pressure, the carbon dioxide-rich bottoms will boil at a lower temperature than had the column been operated at the pressure of the incoming feed stream. Moreover, since the temperature of the stripping column is lower, there can be a close match between the temperature of the partly cooled feed stream that effectuates the boiling and the temperature of the boiling liquid. As a result, the overall process is more efficient because it allows recovery of carbon dioxide at highest possible pressure and reduces the energy required for further compressing carbon dioxide product. This will in turn result in an advantage that less refrigeration need be supplied through expansion to also lower the compression requirement for the incoming feed stream. Lowering the reboiler temperature also allows sufficient heat transfer from the feed stream to the reboiler of the stripping column so that high purity of carbon dioxide is achieved. Further subcooling of the feed stream in the main heat exchanger after it has supplied heat for the reboiler is also advantageous as it lowers the carbon dioxide content of the overhead vapor from the stripping column and thus reduces the volume of recycle stream and thus power required to recompress it. Since the stripping column is operating at a lower temperature, more carbon dioxide will be liquefied resulting in enhanced recovery of the carbon dioxide product. Additionally, no external refrigeration is used and the process is entirely self refrigerated by expansion of the liquid.

The refrigeration recovering means can comprise an auxiliary heat exchanger connected to the stripping column and configured to at least partially liquefy the carbon dioxide-lean stream. Further, a phase separator is connected to the auxiliary heat exchanger so that the carbon dioxide-lean stream, after having been at least partially liquefied, is introduced into the phase separator to produce a carbon dioxide-depleted vapor stream and a carbon dioxide-rich liquid stream. Also provided is a liquid expansion valve for expanding the carbon dioxide-rich liquid stream. The auxiliary heat exchanger is connected to the liquid expansion valve and to the phase separator and is also connected to the main heat exchanger so that the carbon dioxide-rich liquid stream after having been expanded and the carbon dioxide-depleted vapor stream are introduced, in succession, into the auxiliary heat exchanger and the main heat exchanger, thereby to cause vaporization of the carbon dioxide-rich liquid stream into a carbon dioxide vapor stream and to recover the refrigeration from the carbon dioxide-lean stream in the main heat exchanger. In a simplified embodiment, the refrigeration recovery means can comprise the main heat exchanger being connected to the stripping column so that the carbon dioxide column overhead stream is introduced into the main heat exchanger to recover the refrigeration. The drying means can comprise means for cooling the feed stream, a dryer having an adsorbent to adsorb moisture within the feed stream and another phase separator positioned between the cooling means and the dryer. The dryer is connected to the main heat exchanger so that the carbon dioxide vapor stream or the carbon dioxide-depleted stream is utilized at least in part to regenerate the adsorbent. A feed compressor can be connected to the cooling means so that the feed stream is compressed by the feed compressor prior to being cooled. Preferably, the dryer is connected to the main heat exchanger so that the carbon dioxide vapor stream utilized to regenerate the adsorbent and the feed compressor is connected to the dryer so that the carbon dioxide vapor stream is recycled back to a feed compressor from the dryer. This is particularly desirable in that carbon dioxide that is contained in such stream is recycled for eventual recovery. Additionally, the carbon dioxide-depleted stream that can contain hydrogen, carbon monoxide and methane and extracted from a hydrogen plant can be returned to a hydrogen plant for further product recovery or for its use as a fuel.

A further phase separator can be connected to the main heat exchanger so as to receive the feed stream after having at least been partially liquefied in the main heat exchanger and thereby to produce a vapor phase stream and a liquid phase stream. The stripping column is connected to the further phase separator so that the liquid phase stream is introduced into the stripping column to at least in part introduce the feed stream, after having at least been partially liquefied in the main heat exchanger, into the stripping column. The refrigeration recovery means is connected to the further phase separator and the stripping column so that the vapor phase stream and the carbon dioxide overhead stream combined to form the carbon dioxide-lean stream. As indicated above, where the auxiliary heat exchanger is utilized in the refrigeration recovery means, the auxiliary heat exchanger is connected to the further phase separator so that the vapor phase stream is combined with the column overhead stream to form the carbon dioxide-lean stream.

Advantageously, the at least one product stream expansion valve can comprise a higher pressure expansion valve and a lower pressure expansion valve connected to the stripping column such that the carbon dioxide product stream is divided into a first subsidiary carbon dioxide product stream and a second subsidiary carbon dioxide product stream. The first subsidiary carbon dioxide product stream flows through the higher pressure expansion valve and the second subsidiary carbon dioxide product stream flows though the lower pressure expansion valve. The higher pressure expansion valve and the lower pressure expansion valve are configured such that the first subsidiary carbon dioxide product stream and the second subsidiary carbon dioxide product streams are expanded to higher and lower pressures, respectively. The main heat exchanger is connected to the higher pressure expansion valve and the lower pressure expansion valve so that the first subsidiary carbon dioxide product stream and the second subsidiary carbon dioxide product stream are vaporized. The compressor is connected to the main heat exchanger so that the first subsidiary carbon dioxide product stream is introduced into a higher pressure stage of the compressor and the second subsidiary carbon dioxide product stream is introduced into an inlet of the compressor. Thus, not all of the product, after having been vaporized, has to be compressed at a single pressure, rather one stream is compressed at a lower pressure and the other stream is compressed at a yet higher pressure to obtain an energy efficient compression.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

In order to avoid repetition in the discussion of the Figures, the same reference numbers have been used for elements in the Figures where the description of the elements remains unchanged.

DETAILED DESCRIPTION

Figure 1:
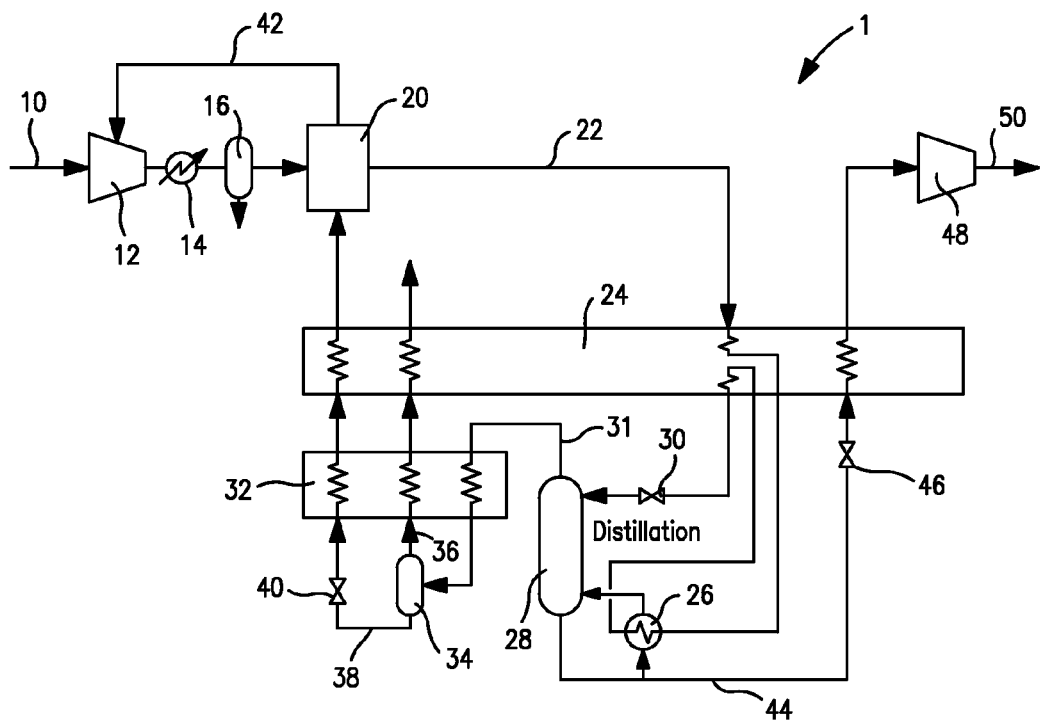
FIG. 1 is a schematic process flow diagram of an apparatus for carrying out a method in accordance with the present invention.

With reference to FIG. 1 an apparatus 1 is illustrated that is designed to purify a carbon dioxide containing feed stream 10.

Carbon dioxide feed stream 10 is compressed in a compressor 12 to a pressure of between about 150 psia and about 1000 psia. The amount of carbon dioxide that can be recovered is a function of the feed pressure supplied to the cold box. As can be appreciated, carbon dioxide recovery can be increased by increasing this pressure. However, such increase in pressure will result in greater production costs. The optimum pressure will therefore vary with the particular application of the present invention. After having been cooled within water cooled chiller 14, the carbon dioxide containing feed stream 10 is then introduced into a phase separator 16 to disengage water that has been condensed within carbon dioxide containing feed stream 10 by virtue of its having been cooled in water cooled chiller 14.

It is to be noted that certain carbon dioxide containing feed streams having applicability to the present invention are available at high pressure, for example, a synthesis gas stream from a gasification process after it has undergone shift reaction. Of course, where the feed stream is available at pressure, it would not have to be compressed and possibly not cooled depending on its origin.

The carbon dioxide containing feed stream 10 is then introduced into a dryer 20. Dryer 20 is preferably an adsorption system that can contain beds of molecular sieve adsorbent operating out a phase to adsorb moisture and other impurities such as heavy hydrocarbons that will boil at a higher temperature than the compressed carbon dioxide containing stream 10. The beds of molecular sieve adsorbent operate out a phase so that as one bed is adsorbing such higher boiling impurities the other bed is being regenerated. A bed is regenerated by lowering its pressure and/or by increasing its temperature to desorb the adsorbed component and then purging the bed with a stream that is lean in the adsorbed component. In a system that employs temperature swing, the bed is regenerated by heating a stream lean in the adsorbed component and then introducing it into the bed to be regenerated to cause desorption and to carry away desorbed components. These systems vary but there are many examples of the same known that are well known in the art. A specific example will be discussed hereinbelow. In this regard, non-adsorbent based systems are possible such as by the use of reversing heat exchangers that are well known in the art of distillation.

The resultant dried feed stream 22, that consists of feed stream 10 after having been compressed by compressor 12 and dried, is then introduced into a main heat exchanger 24 in which it is partly cooled and then introduced into a reboiler 26 that serves to produce boil up or initiate an ascending vapor phase within stripping column 28. Dried feed stream 22 is then again introduced into main heat exchanger 24 in which it is fully cooled to at least partially liquefy the dried feed stream 22. The dried feed stream 22 is then introduced into an expansion valve 30 into stripping column 28 to initiate a descending liquid phase within such column.

As well known in the art, stripping column preferably has structured packing to contact the ascending vapor phase flowing up through the packing with a descending liquid film of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Assuming that feed stream 10 consists of a synthesis gas, then impurities such as hydrogen, carbon monoxide and methane, all being more volatile than the carbon dioxide, will be stripped from the descending liquid to produce a carbon dioxide-lean column overhead and a carbon dioxide-rich, liquid column bottoms.

A column overhead stream 31 can be extracted from stripping column 28 that is composed of the carbon dioxide-lean column overhead and then introduced into an auxiliary heat exchanger 32 so that the carbon dioxide overhead stream 31 is at least partially liquefied. The carbon dioxide overhead stream 31 is then introduced into a phase separator 34 to produce a carbon dioxide-depleted vapor stream 36 and a carbon dioxide-rich liquid stream 38. Carbon dioxide-rich liquid stream is expanded within an expansion valve 40 and then passed together with the carbon dioxide-depleted vapor stream 36 into auxiliary heat exchanger 32. Expansion valve 40 provides refrigeration for the partial liquefaction of carbon dioxide overhead stream 31.

Carbon dioxide-depleted vapor stream 36 can be passed into main heat exchange 34 and either vented to atmosphere or sent for recovery depending upon the value of the components that it contains. For example, carbon dioxide-depleted vapor stream 36 can be rich in hydrogen, carbon monoxide and methane when feed stream 10 is a synthesis gas stream. Preferably, such stream is returned to the hydrogen plant from which the synthesis gas stream was generated for further recovery or for use as a fuel. If feed stream 10 were obtained from a recycled gas used in enhanced oil recovery then carbon dioxide-depleted vapor stream 36 will predominantly contain methane and small amounts of heavier hydrocarbons. Preferably such stream is sent for further processing to recover methane and heavier hydrocarbons. If feed stream 10 were obtained from a oxy-fuel combustion flue gas then carbon dioxide-depleted stream 36 will contain in the main oxygen, nitrogen and argon and as such, could simply be vented to the atmosphere.

Carbon dioxide-rich liquid stream 38 after having passed through main heat exchanger 24 will be vaporized and as such can be used to regenerate dryer 20, for example, such stream can be heated and then introduced into an adsorption bed for regeneration purposes and thereafter, reintroduced as a recycle stream 42 into an appropriate stage of compressor 12 to enhance carbon dioxide recovery.

A carbon dioxide product stream 44 as a liquid can be extracted from stripping column 28 that is composed of carbon dioxide-rich liquid column bottoms. The carbon dioxide product stream can then be expanded in an expansion valve 46 to generate refrigeration for the process and thereafter, be vaporized within main heat exchanger 24 and compressed in a product compressor 48 to produce a compressed carbon dioxide stream 50 as the carbon dioxide product. The product compressor 48 could be a multi-stage compressor with interstage cooling. It is to be noted, that, although not illustrated, some of the carbon dioxide product could be taken as a liquid from carbon dioxide product stream 44.

Figure 2:
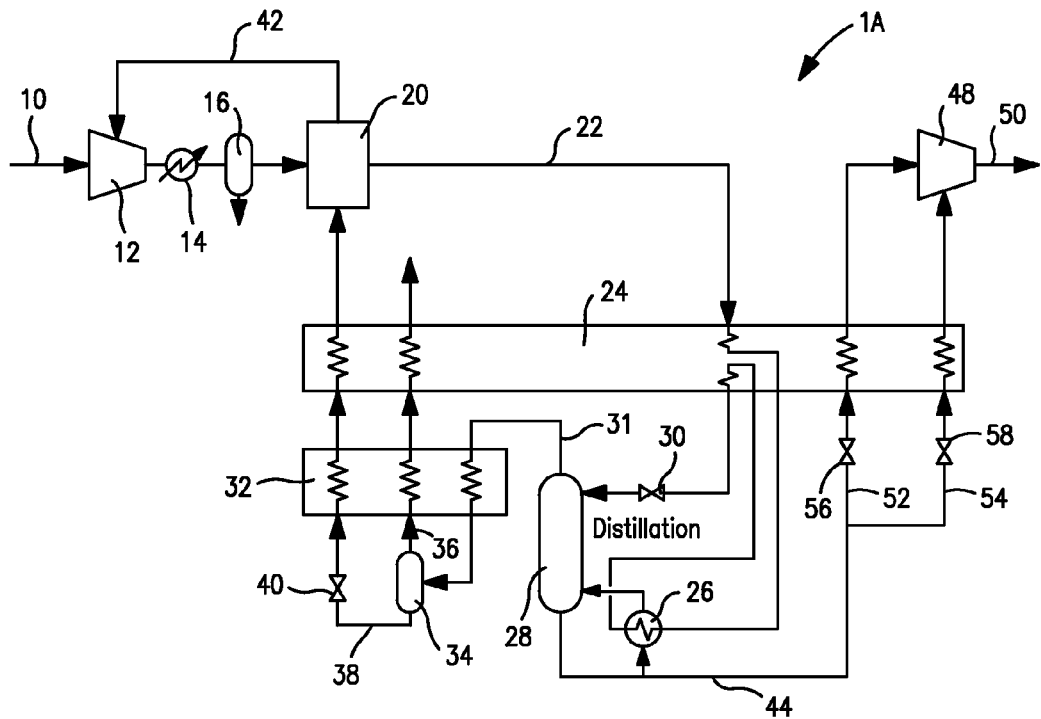
FIG. 2 is an alternative embodiment of FIG. 1.

With reference to FIG. 2, an apparatus 1A is illustrated. In this particular embodiment of the present invention, carbon dioxide product stream 44 is not expanded at the same pressure and advantageously, is split into subsidiary streams 52 and 54 and at least the subsidiary stream 52 is expanded to lower pressure by the use of expansion valve 56, optionally both streams 52 and 54 are simultaneously expanded to lower and the higher pressures by the use of expansion valves 56 and 58, respectively having different orifices for such purposes. Both subsidiary streams 52 and 54 are then vaporized in main heat exchanger 24. The resultant lower pressure subsidiary stream 52 is introduced into the inlet of product compressor 48. The higher pressure subsidiary stream 54 is introduced into an intermediate stage of product compressor 48.

Figure 3:
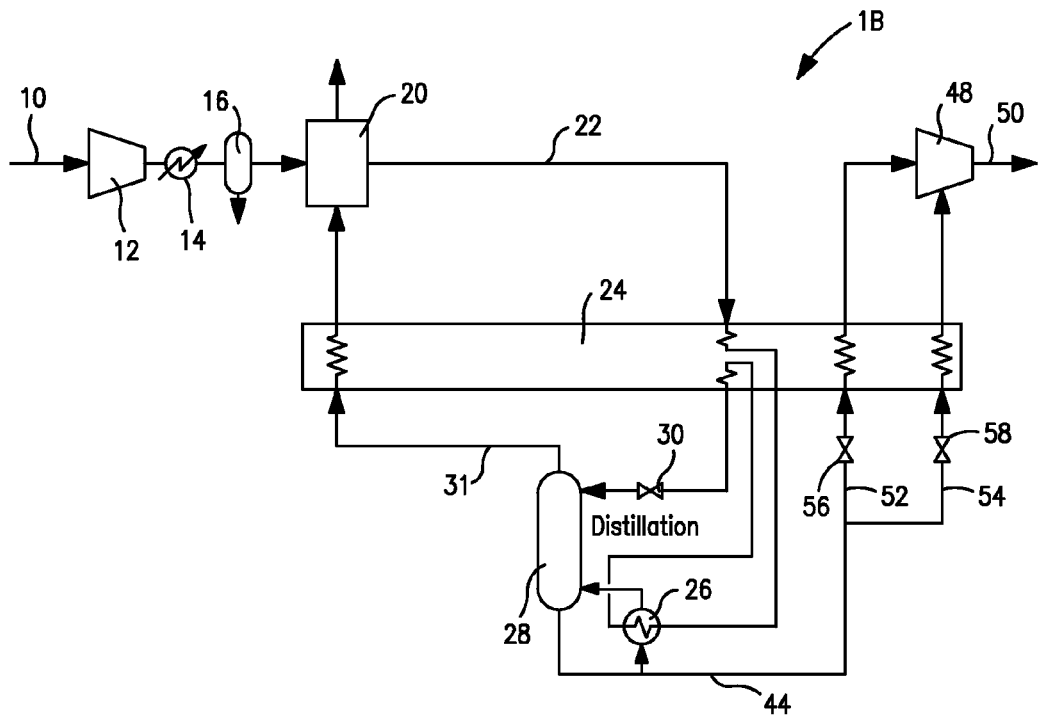
FIG. 3 is an alternative embodiment of FIG. 2.

With reference to FIG. 3, an apparatus 1B is illustrated. In this embodiment of the present invention, column overhead stream 31 can simply be passed into main heat exchanger 24. As in the separate embodiments, this recovers refrigeration from column overhead stream 30. Column overhead stream 31 being lean in water can then be passed through dryer 20 and either vented or possibly recovered as in the previous embodiments.

Figure 4:
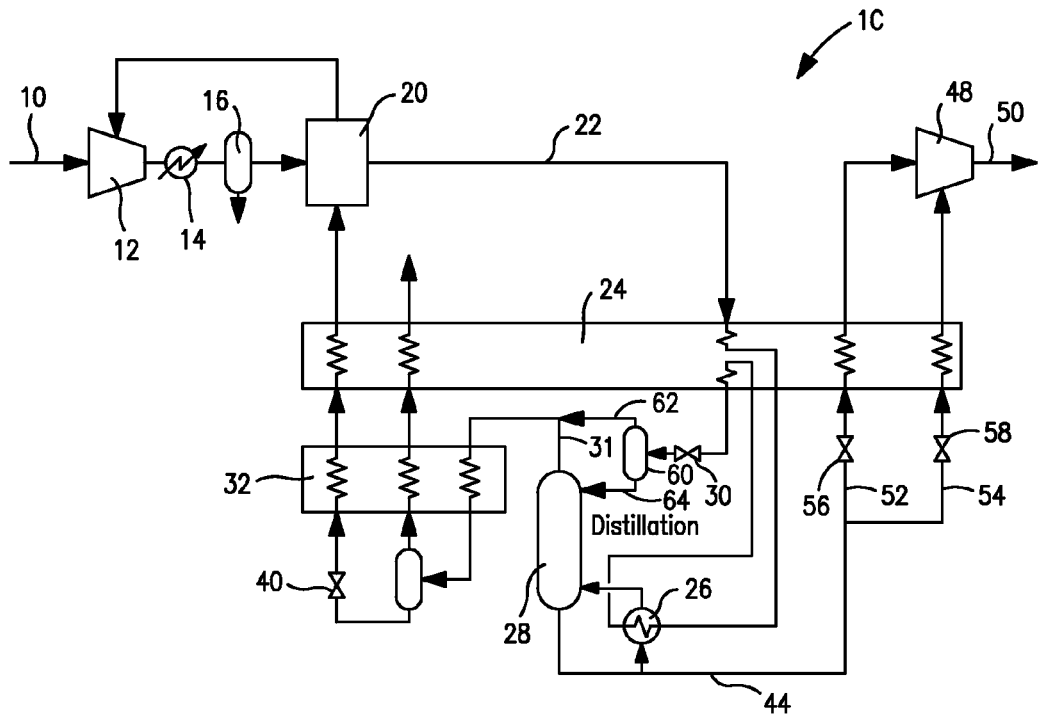
FIG. 4 is an alternative embodiment of FIG. 2.

With reference to FIG. 4, an apparatus 1C in accordance with the present invention is illustrated. In such apparatus, the dried feed stream 22 after having been fully cooled and expanded by expansion valve 30 can be introduced into a phase separator 60 to produce a vapor phase stream 62 and a liquid phase stream 64. Liquid phase stream 64 is introduced into stripping column 28 to produce the carbon dioxide containing column bottoms and vapor phase streams 62 can be combined with column overhead stream 31 and processed within auxiliary heat exchanger 32 as described in connection with the embodiment of the invention described with respect to FIG. 1. Phase separator 60 could be used in any embodiment of the present invention.

Other variations are also possible. For example, stream 36 in apparatus 1, 1A and 1C4 or stream 31 in apparatus 1B can be expanded after it is warmed in the main heat exchanger or after it is further heated for recovering pressure energy as electric power.

To minimize the amount of moisture removed by dryer 20, compressed feed stream can be first cooled in the main heat exchanger 24 to about 50° F. to condense out more water and separate water in a phase separator and then feed it to dryer 20. The dried feed is fed to the main heat exchanger at appropriate location and processed as described before.

Figure 5:
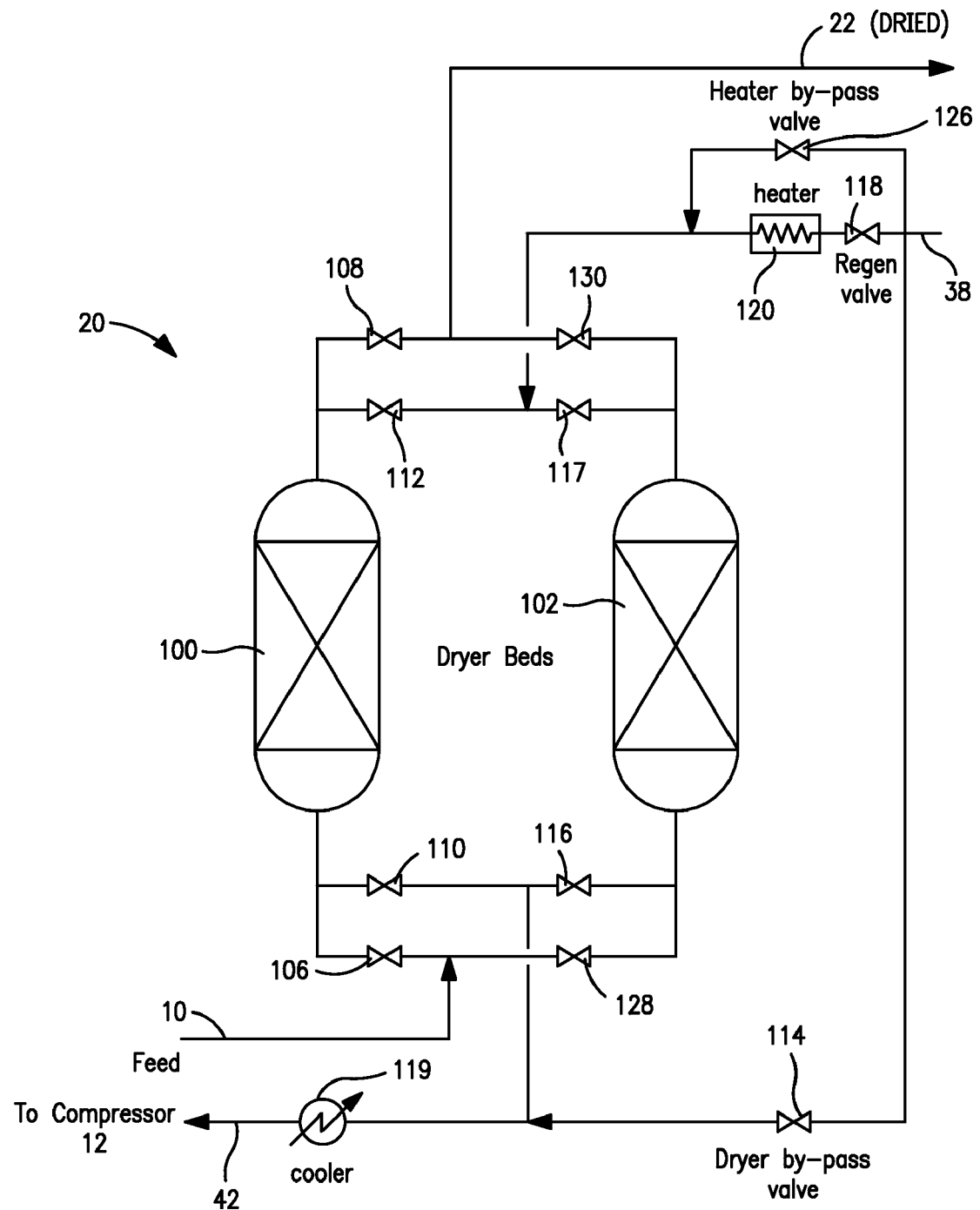
FIG. 5 is a schematic illustration of a dryer that could be used in connection with the embodiments illustrated in FIGS. 1, 2, 3 and 4.

With reference to FIG. 5, an embodiment of dryer 20 is illustrated that could be used in connection with all of the embodiments described above. Dryer 20 has two beds 100 and 104 containing an alumina adsorbent. When bed 100 is on-line adsorbing moisture from feed stream 10, valves 106 and 108 are open. Valves 110 and 112 are closed. At such time, bed 104 is being regenerated, for such purposes, bed 104 is subject to depressurization, heating to desorb the previously adsorbed moisture, cooling and then repressurization to bring bed 104 back on line and adsorbing.

During depressurization, dryer by-pass valve 114 is set in the open position and vaporized carbon dioxide-rich liquid stream 38 used for the regeneration by-passes bed 104 and flows to compressor 12 after having been cooled in cooler 119. Valve 116 is set in an open position allowing bed 104 to depressurize. After bed 104 is depressurized, valve 114 closes and valves 116, 117 and 118 open allowing the vaporized carbon dioxide-rich liquid stream 38 to pass through a heater 120 to heat the vaporized carbon dioxide-rich liquid stream 38 to a temperature of between about 300° F. to 600° F., pass through bed 102 and be discharged to compressor 12 after having passed through cooler 119. This causes moisture to desorb from the adsorbent within bed 102. Bed 104 is then cooled by opening heater by-pass valve 126 and closing regeneration valve 118. After cooling, heater by-pass valve 126 and valves 116 and 117 are closed and dryer by-pass valve 114 opens. At this time, valve 128 is cracked open allowing some of the feed stream 10 to enter bed 104 for repressurization purposes. Once repressurized, valves 106 and 108 are set in a closed position and valves 128 and 130 are set in open positions allowing bed 102 to be brought back on line and bed 102 to be regenerated in the same manner as bed 104 and with the use of valves 110 and 112. The process is continuous to allow for continuous flow.

The following are calculated examples of the application of the present invention to the treatment of various streams.

Example 1

In the following example, feed stream 10 is a recycled gas from an enhanced oil recovery facility with the objective of removing methane and nitrogen from such recycled stream before re-injecting it in the oilfield. The embodiment illustrated in FIG. 1 was used for purposes of this Example. The target methane level in this example is 100 ppm in the recovered carbon dioxide and the recovery was about 93.5 percent by volume. As a result of purification, components undesirable for enhanced oil recovery, such as methane and nitrogen were removed, while C(2)+ hydrocarbons were largely retained in the recycled carbon dioxide stream. The pressure of compressed carbon dioxide stream 50 can be set depending on the reservoir pressure requirement for re-injection of the carbon dioxide. The carbon dioxide depleted stream 36 containing methane and other hydrocarbons can be sent to further processing to recover natural gas for sale. Tabular results for this example are given in Table 2.

TABLE 1

| | Stream | | | | |
|---|---|---|---|---|---|
| | 10 | 22 | 44 | 38 | 36 |
| Flow, lbmol/h | 2000 | 2000 | 1726 | 275 | 605 |
| Temperature, ° F. | 95 | 95 | 83 | 83 | 83 |
| Pressure, psia | 20 | 300 | 208 | 237 | 148 |
| Composition (mol % dry basis) | | | | | |
| $CO_2$ | 88 | 88 | 95.28 | 42.2 | 90.0 |
| $CH_4$ | 5 | 5 | 0.01 | 36.4 | 3.7 |
| $C_2H_6$ | 3 | 3 | 2.44 | 6.5 | 4.7 |
| C3H8 | 1 | 1 | 1.11 | 2.8 | 0.8 |
| n-C4H10 | 1 | 1 | 1.16 | 0.3 | 0.2 |
| $N_2$ | 2 | 2 | 0 | 14.6 | 0.6 |

In Table 1, the physical properties of dried feed stream 22 are given prior to such stream entering main heat exchanger 24. In this regard, after having been partly cooled within main heat exchanger 24, the temperature of dried feed stream 22 is about −8° F.; after passage through reboiler 26, the temperature of dried feed stream 22 is about −9° F.; after having been fully cooled within main heat exchanger 24, the temperature of dried feed stream 22 is about −20° F.; and after having passed through expansion valve 30, the temperature of carbon dioxide-depleted vapor stream 30 and dried feed stream 22 is about −28° F. and dried feed stream 22 has a pressure of about 250 psia. Additionally, the physical state of stream 44 is given after its discharge from main heat exchanger 24 and prior to being compressed. Likewise, the physical states of carbon dioxide depleted stream 36 and carbon dioxide-rich liquid stream 38 are given after having been discharged from the warm end of main heat exchanger 24 and as such carbon dioxide-rich liquid stream has been vaporized.

Example 2

In this example, the objective is to remove oxygen, nitrogen and argon from the feed stream 10, which in this case is formed from oxy-fuel combustion flue gas, to produce purified carbon dioxide stream for EOR or sequestration. It is preferred to reduce oxygen concentration to 10 ppm or less and that was used as the specification for purification. The embodiment shown in FIG. 2 was used and the carbon dioxide recovery of about 86.5 percent on a volume basis was obtained. The carbon dioxide depleted stream 36 can be heated and then expanded for power recovery before venting to atmosphere. Tabular results are given in the following Table 2.

TABLE 2

| | Stream | | | | | |
|---|---|---|---|---|---|---|
| | 10 | 22 | 52 | 54 | 36 | 38 |
| Flow, lbmol/h | 10000 | 10000 | 4049 | 2699 | 3252 | 720 |
| Temperature, ° F. | 95 | 95 | 55 | 55 | 55 | 55 |
| Pressure, psia | 14.7 | 700 | 180 | 340 | 445 | 135 |
| Composition (mol % dry basis) | | | | | | |
| $CO_2$ | 78 | 78 | 99.9873 | 99.9873 | 32.4 | 95.2 |
| $O_2$ | 5 | 5 | 0.0010 | 0.0010 | 15.3 | 1.2 |
| Argon | 4 | 4 | 0.0115 | 0.0115 | 12.3 | 1.4 |
| $N_2$ | 13 | 13 | 0.0002 | 0.0002 | 40.0 | 2.2 |
| Stream | 10 | 22 | 52 | 54 | 36 | 38 |
| Flow, lbmol/h | 10000 | 10000 | 4049 | 2699 | 3252 | 720 |

In Table 2, the physical properties of dried feed stream 22 are given prior to such stream entering main heat exchanger 24. In this regard, after having been partly cooled within main heat exchanger 24, the temperature of dried feed stream 22 is about 35° F.; after passage through reboiler 26, the temperature of dried feed stream 22 is about 24° F.; after having been fully cooled within main heat exchanger 24, the temperature of dried feed stream 22 is about −25° F.; and after having passed through expansion valve 30, the temperature of carbon dioxide-depleted vapor stream 30 and dried feed stream 22 is about −38° F. and dried feed stream 22 has a pressure of about 430 psia. Additionally, the physical states of subsidiary streams 52 and 54 are given after their discharge from main heat exchanger 24 and prior to being compressed. Likewise, the physical states of carbon dioxide depleted stream 36 and carbon dioxide-rich liquid stream 38 are given after having been discharged from the warm end of main heat exchanger 24 and as such carbon dioxide-rich liquid stream has been vaporized.

Although the invention has been described with respect to preferred embodiments, as will occur to those skilled in the art, numerous changes, additions and omissions can be made without departing from the spirit and scope of the present invention.

We claim:

1. An apparatus for purifying a feed stream containing carbon dioxide to obtain a carbon dioxide product, said apparatus comprising:

means for drying a feed stream having a super atmospheric pressure;

a main heat exchanger connected to the drying means and configured to partially cool the feed stream after having been dried;

a stripping column having contacting elements to contact a descending liquid phase with an ascending vapor phase within the stripping column to strip impurities from the descending liquid phase and thereby to produce a carbon dioxide-Jean column overhead and a carbon dioxide-rich, liquid column bottoms;

a reboiler operatively associated with the stripping column to initiate the formation of the ascending vapor phase within the stripping column and connected to the main heat exchanger so that the stripping column is reboiled with the feed stream after having been partially cooled and the feed stream is further cooled within the reboiler;

the main heat exchanger also connected to the reboiler and configured to at least partially liquefy the feed stream after the feed stream is further cooled within the reboiler;

the stripping column in flow communication with the main heat exchanger such that the stripping column receives at least part of the feed stream after having been partially liquefied in the main heat exchanger and the descending liquid phase is thereby established within the stripping column;

a feed stream expansion valve positioned between the main heat exchanger and the stripping column so that, prior to reception of the at least part of the feed stream into the stripping column, the feed stream is expanded to an operational pressure of the stripping column that is less than that of the feed stream, thereby to lower a reboiling temperature at which the stripping column reboils to a level that is below the feed stream temperature after having been partially cooled;

means for recovering refrigeration in the main heat exchanger from a carbon dioxide-lean stream composed at least in part of a column overhead stream column made up of the carbon dioxide-lean column overhead of the stripping column;

at least one product stream expansion valve connected to the stripping column for expanding a carbon dioxide product stream composed of the carbon dioxide-rich, liquid column bottoms of the stripping column;

the main heat exchanger connected to the at least one product stream expansion valve and also configured to vaporize the carbon dioxide product stream; and a compressor connected to the main heat exchanger for compressing the carbon dioxide product stream to obtain a compressed carbon dioxide stream as at least part of the carbon dioxide product.

2. The apparatus of claim 1, wherein the refrigeration recovering means comprises:

an auxiliary heat exchanger connected to the stripping column and configured to at least partially liquefy the carbon dioxide-lean stream;

a phase separator connected to the auxiliary heat exchanger so that the carbon dioxide-lean stream, after having been at least partially liquefied, is introduced into the phase separator to produce a carbon dioxide-depleted vapor stream and a carbon dioxide-rich liquid stream;

a liquid expansion valve for expanding the carbon dioxide-rich liquid stream; and the auxiliary heat exchanger connected to the liquid expansion valve and to the phase separator and also connected to the main heat exchanger so that the carbon dioxide-rich liquid stream after having been expanded and the carbon dioxide-depleted vapor stream are introduced, in succession, into the auxiliary heat exchanger and the main heat exchanger, thereby to cause vaporization of the carbon dioxide-rich liquid stream into a carbon dioxide vapor stream and to recover the refrigeration from the column overhead stream in the main heat exchanger.

3. The apparatus of claim 2, wherein:

the drying means comprises means for cooling the feed stream, a dryer having an adsorbent to adsorb moisture within the feed stream and another phase separator positioned between the cooling means and the dryer; and the dryer is connected to the main heat exchanger so that the carbon dioxide vapor stream or the carbon dioxide-depleted stream is utilized at least in part to regenerate the adsorbent.

4. The apparatus of claim 3, wherein:

a feed compressor is connected to the cooling means so that the feed stream is compressed by the feed compressor prior to being cooled;

the dryer is connected to the main heat exchanger so that the carbon dioxide vapor stream is utilized to regenerate the adsorbent; and the feed compressor is connected to the dryer so that the carbon dioxide vapor stream is recycled back to a feed compressor from the dryer.

5. The apparatus of claim 2, wherein:

a further phase separator is connected to the main heat exchanger so as to receive the feed stream after having at least been partially liquefied in the main heat exchanger and thereby to produce a vapor phase stream and a liquid phase stream;

the stripping column is connected to the further phase separator so that the liquid phase stream is introduced into the stripping column to at least in part introduce the feed stream, after having at least been partially liquefied in the main heat exchanger, into the stripping column; and the auxiliary heat exchanger is connected to the further phase separator so that the vapor phase stream is combined with the column overhead stream to form the carbon dioxide-lean stream.

6. The apparatus of claim 1, wherein:

a further phase separator is connected to the main heat exchanger so as to receive the feed stream after having at least been partially liquefied in the main heat exchanger and thereby to produce a vapor phase stream and a liquid phase stream;

the stripping column is connected to the further phase separator so that the liquid phase stream is introduced into the stripping column to at least in part introduce the feed stream, after having at least been partially liquefied in the main heat exchanger, into the stripping column; and the refrigeration recovery means is connected to the further phase separator and the stripping column so that the vapor phase stream and the carbon dioxide overhead stream combine to form the carbon dioxide-lean stream.

7. The apparatus of claim 1, wherein:
the at least one product stream expansion valve comprises a higher pressure expansion valve and a lower pressure expansion valve connected to the stripping column such that the carbon dioxide product stream is divided into a first subsidiary carbon dioxide product stream and a second subsidiary carbon dioxide product stream, the first subsidiary carbon dioxide product stream flows through the higher pressure expansion valve and the second subsidiary carbon dioxide product stream flows though the lower pressure expansion valve;
the higher pressure expansion valve and the lower pressure expansion valve are configured such that the first subsidiary carbon dioxide product stream and the second subsidiary carbon dioxide product streams are expanded to higher and lower pressures, respectively;
the main heat exchanger is connected to the higher pressure expansion valve and the lower pressure expansion valve so that the first subsidiary carbon dioxide product stream and the second subsidiary carbon dioxide product stream are vaporized; and
the compressor is connected to the main heat exchanger so that the first subsidiary carbon dioxide product stream is introduced into a higher pressure stage of the compressor and the second subsidiary carbon dioxide product stream is introduced into an inlet of the compressor.

8. The apparatus of claim 2, wherein:
the at least one product stream expansion valve comprises a higher pressure expansion valve and a lower pressure expansion valve connected to the stripping column such that the carbon dioxide product stream is divided into a first subsidiary carbon dioxide product stream and a second subsidiary carbon dioxide product stream, the first subsidiary carbon dioxide product stream flows through the higher pressure expansion valve and the second subsidiary carbon dioxide product stream flows though the lower pressure expansion valve;
the higher pressure expansion valve and the lower pressure expansion valve are configured such that the first subsidiary carbon dioxide product stream and the second subsidiary carbon dioxide product streams are expanded to higher and lower pressures, respectively;
the main heat exchanger is connected to the higher pressure expansion valve and the lower pressure expansion valve so that the first subsidiary carbon dioxide product stream and the second subsidiary carbon dioxide product stream are vaporized; and
the compressor is connected to the main heat exchanger so that the first subsidiary carbon dioxide product stream is introduced into a higher pressure stage of the compressor and the second subsidiary carbon dioxide product stream is introduced into an inlet of the compressor.

9. The apparatus of claim 5, wherein:
the at least one product stream expansion valve comprises a higher pressure expansion valve and a lower pressure expansion valve connected to the stripping column such that the carbon dioxide product stream is divided into a first subsidiary carbon dioxide product stream and a second subsidiary carbon dioxide product stream, the first subsidiary carbon dioxide product stream flows through the higher pressure expansion valve and the second subsidiary carbon dioxide product stream flows though the lower pressure expansion valve;
the higher pressure expansion valve and the lower pressure expansion valve are configured such that the first subsidiary carbon dioxide product stream and the second subsidiary carbon dioxide product streams are expanded to higher and lower pressures, respectively;
the main heat exchanger is connected to the higher pressure expansion valve and the lower pressure expansion valve so that the first subsidiary carbon dioxide product stream and the second subsidiary carbon dioxide product stream are vaporized; and
the compressor is connected to the main heat exchanger so that the first subsidiary carbon dioxide product stream is introduced into a higher pressure stage of the compressor and the second subsidiary carbon dioxide product stream is introduced into an inlet of the compressor.

10. The apparatus of claim 1, wherein the refrigeration recovery means comprises the main heat exchanger connected to the stripping column so that the carbon dioxide column overhead stream is introduced into the main heat exchanger to recover the refrigeration.

11. The apparatus of claim 10, wherein:
the drying means comprises means for cooling the feed stream, a dryer having an adsorbent to adsorb moisture within the feed stream and another phase separator positioned between the cooling means and the dryer; and
the dryer is connected to the main heat exchanger so that the carbon dioxide column overhead stream is utilized to regenerate the adsorbent.

12. The apparatus of claim 10, wherein:
the at least one product stream expansion valve comprises a higher pressure expansion valve and a lower pressure expansion valve connected to the stripping column such that the carbon dioxide product stream is divided into a first subsidiary carbon dioxide product stream and a second subsidiary carbon dioxide product stream, the first subsidiary carbon dioxide product stream flows through the higher pressure expansion valve and the second subsidiary carbon dioxide product stream flows though the lower pressure expansion valve;
the higher pressure expansion valve and the lower pressure expansion valve are configured such that the first subsidiary carbon dioxide product stream and the second subsidiary carbon dioxide product streams are expanded to higher and lower pressures, respectively;
the main heat exchanger is connected to the higher pressure expansion valve and the lower pressure expansion valve so that the first subsidiary carbon dioxide product stream and the second subsidiary carbon dioxide product stream are vaporized; and
the compressor is connected to the main heat exchanger so that the first subsidiary carbon dioxide product stream is introduced into a higher pressure stage of the compressor and the second subsidiary carbon dioxide product stream is introduced into an inlet of the compressor.

* * * * *